United States Patent
Khurgin et al.

(10) Patent No.: US 7,974,543 B2
(45) Date of Patent: *Jul. 5, 2011

(54) OPTICAL RECEIVER AND A FREE-SPACE OPTICAL COMMUNICATIONS USING THE SAME

(75) Inventors: Jacob Khurgin, Baltimore, MD (US); Isaac Shpantzer, Bethesda, MD (US); Arkady Kaplan, Rockville, MD (US); Pak Shing Cho, Gaithersburg, MD (US)

(73) Assignee: CeLight, Inc., Silver Spring, MD (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/331,164

(22) Filed: Dec. 9, 2008

(65) Prior Publication Data

US 2009/0220246 A1 Sep. 3, 2009

Related U.S. Application Data

(63) Continuation-in-part of application No. 10/669,130, filed on Sep. 22, 2003, now Pat. No. 7,327,913, and a continuation-in-part of application No. 11/610,964, filed on Dec. 14, 2006, now Pat. No. 7,397,979, and a continuation-in-part of application No. 11/672,372, filed on Feb. 7, 2007, now Pat. No. 7,483,600, and a continuation-in-part of application No. 11/695,920, filed on Apr. 3, 2007, now Pat. No. 7,715,720, and a continuation-in-part of application No. 12/045,765, filed on Mar. 11, 2008, and a continuation-in-part of application No. 12/137,352, filed on Jun. 11, 2008.

(60) Provisional application No. 61/090,404, filed on Jun. 11, 2008.

(51) Int. Cl.
G02B 6/26 (2006.01)
H04B 10/06 (2006.01)

(52) U.S. Cl. ........... 398/212; 385/15; 398/209; 398/214

(58) Field of Classification Search .......... 398/206–210, 398/212–214
See application file for complete search history.

(56) References Cited

U.S. PATENT DOCUMENTS

| | | | | |
|---|---|---|---|---|
| 5,245,681 A * | 9/1993 | Guignard et al. | ............... | 385/16 |
| 5,323,258 A * | 6/1994 | Tsushima et al. | ............. | 398/203 |
| 5,691,832 A * | 11/1997 | Liedenbaum et al. | .......... | 398/43 |
| 5,946,130 A * | 8/1999 | Rice | ............... | 359/349 |
| 6,882,781 B2 * | 4/2005 | Ionov | ............... | 385/48 |
| 2003/0090765 A1 * | 5/2003 | Neff et al. | ............... | 359/172 |
| 2007/0047954 A1 * | 3/2007 | Mamyshev | .................... | 398/33 |
| 2009/0034967 A1 * | 2/2009 | Tao et al. | ................. | 398/33 |
| 2009/0279902 A1 * | 11/2009 | Granot et al. | ................ | 398/208 |

* cited by examiner

*Primary Examiner* — Rhonda Peace
*Assistant Examiner* — Chris Chu
(74) *Attorney, Agent, or Firm* — Nadya Reingand

(57) ABSTRACT

A device for phase distortion compensation across an optical beam is provided. The device is a part of an optical receiver, which can be used in free space optical communications, remote sensing, optical imaging and others. $2^M$ inputs of the combiner interfere with each other via a system of tunable coupled waveguides. The phases in interleaved waveguides of the combiner are adjusted to maximize the resulting output signal. The combiner may be used for coherent communication in combination with a balanced 90° hybrid. Integrated solutions for the proposed device are provided.

20 Claims, 9 Drawing Sheets

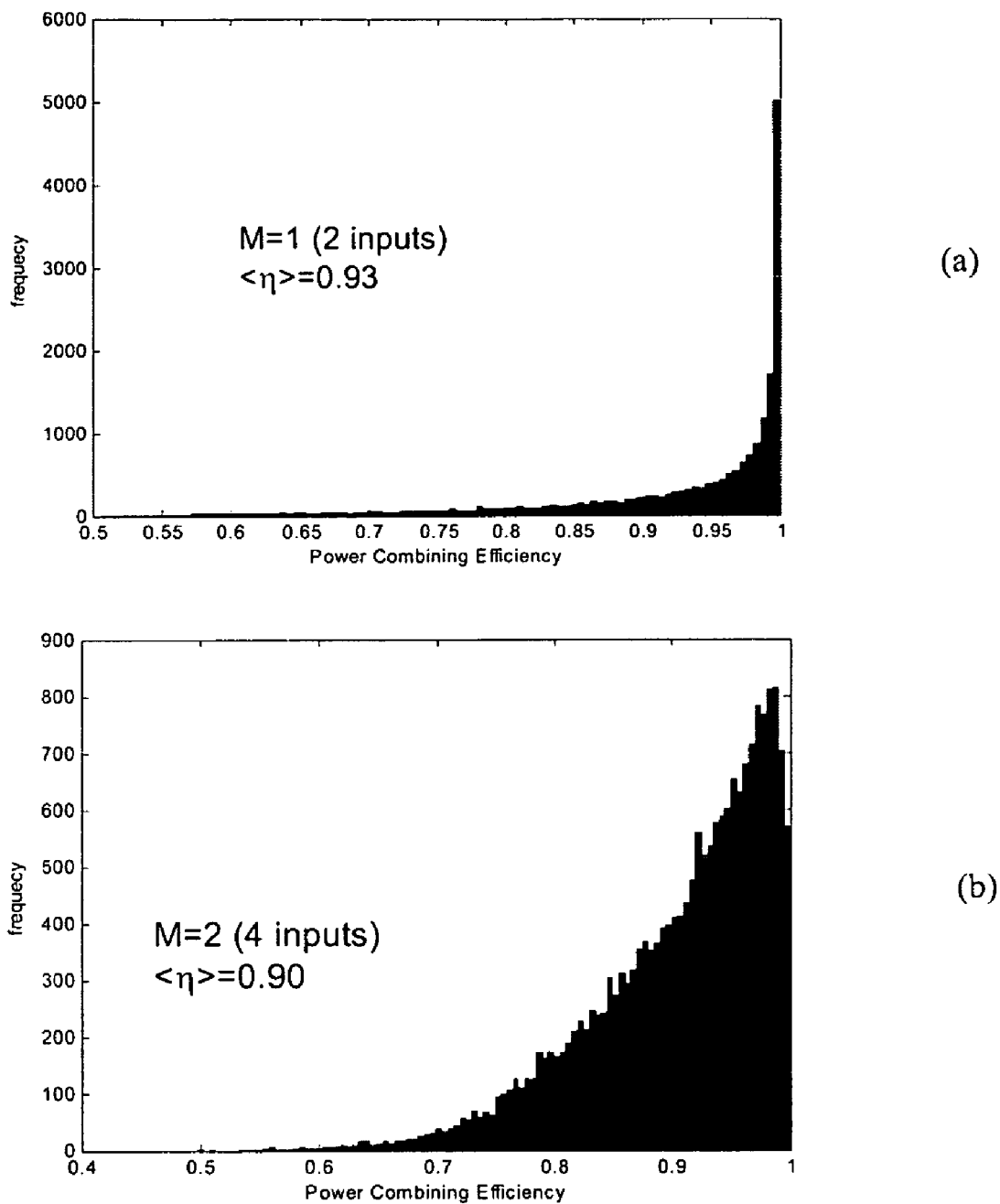
Fig. 3 (a) and (b)

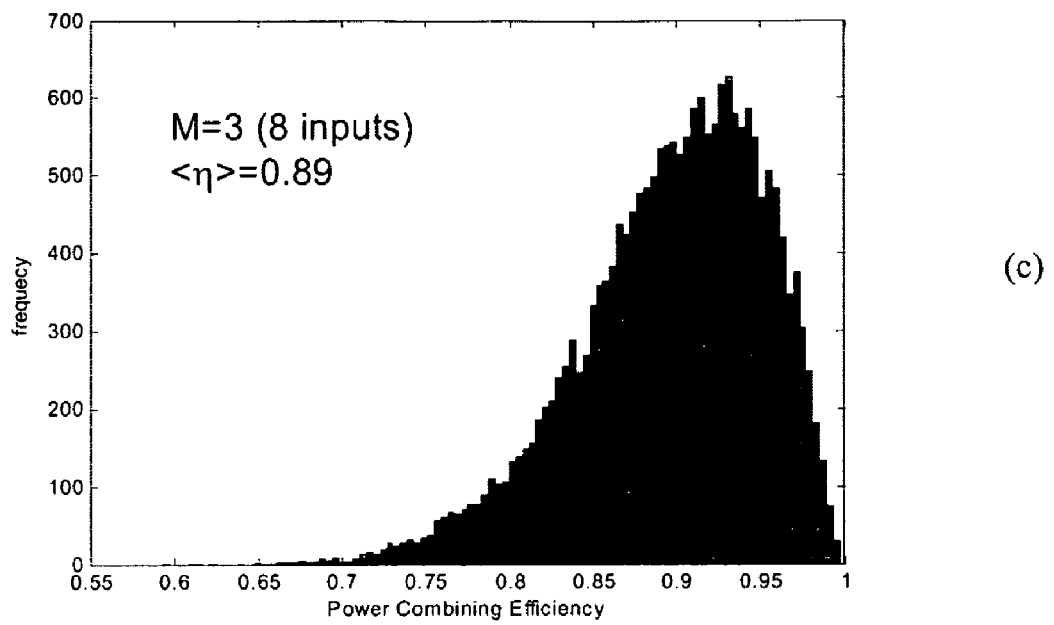
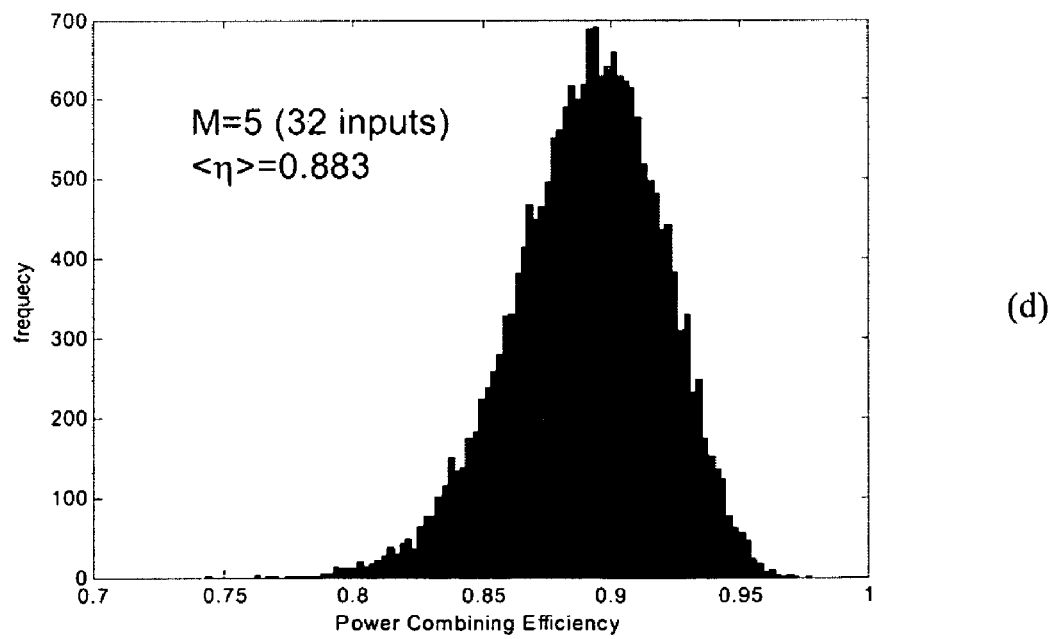
Fig. 3 (c) and (d)

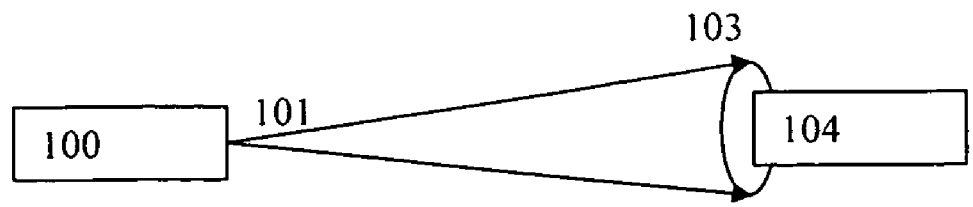
(a)
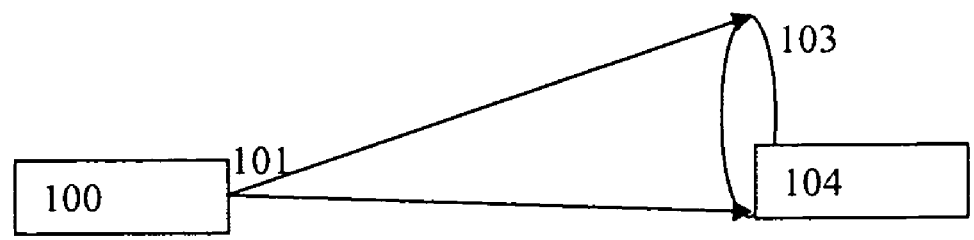
(b)
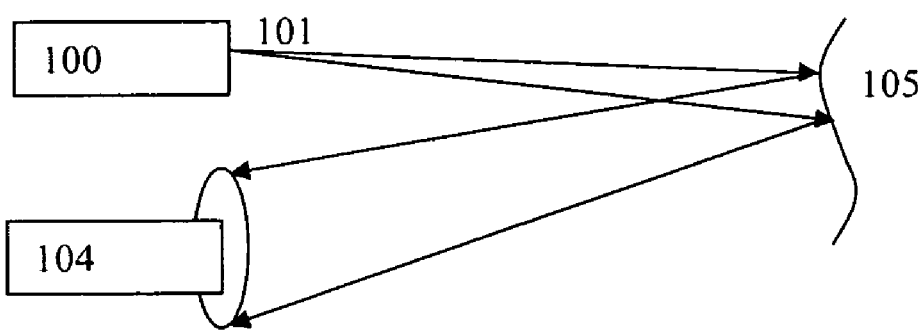
(c)
Fig. 8

OPTICAL RECEIVER AND A FREE-SPACE OPTICAL COMMUNICATIONS USING THE SAME

CROSS-REFERENCE TO RELATED APPLICATIONS

This application claims priority of provisional Application Ser. No. 61/090,404 filed Aug. 20, 2008. It is also a continuation-in-part of U.S. patent application Ser. No. 10/669,130 filed Sep. 22, 2003 now U.S. Pat. No. 7,327,913, No. 11/610,964 filed Dec. 14, 2006 now U.S. Pat. No. 7,397,979; No. 11/672,372 filed Feb. 7, 2007 now U.S. Pat. No. 7,483,600; No. 11/695,920 filed Apr. 3, 2007 now U.S. Pat. No. 7,715,720; No. 12/045,765 filed Mar. 11, 2008; No. 12/137,352 filed Jun. 11, 2008, all of which applications are fully incorporated herein by reference.

FIELD OF THE INVENTION

This invention relates generally to laser systems and methods of receiving at least a portion of the laser beam after its transmission through turbulent media. The system includes means for compensation of the atmospheric perturbations in the received beam. The applications comprise free space optical communications, remote sensing, optical imaging and others.

BACKGROUND OF THE INVENTION

Laser radars, remote sensing equipment, free space, non-line of sight, satellite communication systems are affected by optical turbulence. In this invention we disclose the atmospheric turbulence mitigation approach in view of communication systems, however this approach is applicable for variety of other arrangements.

The atmospheric turbulence effect, noticeable as beam drift and scintillation, is the main source of errors in the free-space optical communications. It leads to the decreased link capacity, BER deterioration and sometimes unavailability of the transmission. Adaptive optics schemes are widely used for the phase correction. Adaptive optical systems require direct measurement of the wave-front phase using wave-front sensors such as a Shack-Hartmann sensor or shearing interferometer, followed by some type of wavefront reconstruction and conjugation. In the presence of the strong phase and intensity fluctuations characteristic of near-earth propagation paths, these types of systems perform poorly. Besides, such systems cannot compensate fast phase change; their operation speed is limited by the data processing time.

There is a need in an efficient solution of the turbulence effects mitigation in optical systems with laser beam propagation through the atmosphere.

SUMMARY OF THE INVENTION

Accordingly, an object of the present invention is to provide an electro-optically adjustable optical device that provides compensating of phase distortion across the optical beam caused by the turbulence. An optical device has 2M input waveguides (M is integer$\geq 2$), each receiving a portion of the incoming optical beam. The waveguides are connected by (2M−1) couplers forming a tree-like structure, each coupler is formed by two waveguides, coming in and out of the coupler. In each coupler one output waveguides is used in control means for changing an input phase of the optical beam portion in the same waveguide before its coupling. Another output waveguide forms an input waveguide for a consequent coupler from (2M−1) couplers. A final output waveguide from the last coupler is an output beam of the device. The control means change the phases of the beams propagating in the waveguides before their coupling. This change aims to maximize the output beam energy. The control means may include a photodetector receiving a beam in the output waveguide, producing an electrical signal being used to change the input phase of the optical beam portion in the same waveguide before its coupling. The input phase is changed in a phase modulator connected to the same waveguide before coupling. Optionally, the control means may also control the coupling rate of all couplers to maximize the output beam energy.

The output signal from the device can be detected and used for further processing, information recovery and display. The device may also include an optical receiver to detect the output beam. In the preferred embodiment this signal is received by a coherent optical receiver. In the coherent receiver it is combined with a local oscillator beam. In one embodiment the receiving beam and the local oscillator beam interfere in a 90-degrees optical hybrid and the output signals are processed by a set of balanced detectors.

It is another object of the present invention to provide a device for optical beam combining, which has at least one beam combining unit, however it may contain any number of those units, being connected between them. The unit includes a first, a second, a third, a fourth waveguides to receive a first, a second, a third, a fourth portions of the optical beam respectively; a first coupler combining the first and the second waveguides and outputting a fifth and a sixth waveguides; a second coupler combining the third and the fourth waveguides and outputting a seventh and a eighth waveguides; a third coupler combining the fifth and the seventh waveguides and outputting a ninth and a tenth waveguides; the sixth, the eighth and the tenth waveguides being connected to a first, a second and a third photodetectors respectively; output signals from the first, the second and the third photodetectors controlling a phase of the second, the fourth and the seventh portions of the optical beam via a first, a second phase and a third modulators respectively; wherein the control includes minimizing the output signals from the first, the second and the third photodetectors; the ninth portion of the optical beam providing an output signal from the device.

Another object of the present invention is to provide an integrated single monolithic adjustable device to perform this operation. However the description is provided of any kind of device: integrated device, a free-space optical link device, and a fiber optics device. In the preferred embodiment the integrated device is a chip made of $LiNbO_3$ material.

Yet another object of the present invention is to provide a system for information recovery, which can find applications in optical communications, remote sensing, optical imaging and other fields. The receiving unit includes an optical beam combiner with a set of input waveguides, each receiving a portion of incoming optical beam. $2^M$ inputs of the combiner interfere with each other via a system of tunable coupled waveguides. The phases in interleaved waveguides of the combiner are adjusted to maximize the resulting output signal. The combiner may be used for coherent communication in combination with a balanced 90° hybrid. The receiving unit may be located as far as 2000 meters from the transmitter. The transmitter may include a light source that generates multiple wavelengths in the UV, optical or infrared ranges. In one embodiment the light source generates a pulsed optical signal.

BRIEF DESCRIPTION OF THE DRAWINGS

FIG. 3 (a)-(d) The results of modeling.

FIG. 8 Optical systems that benefit from using the combiner of the present invention: (a) line-of-sight and (b) non-line-of-sight optical communications, (c) systems with reflected optical beam, such as imaging systems, remote sensing, etc.

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Optical signal transmission in free space is susceptible to atmospheric-induced attenuation and scattering. At the receiver side the beam must be collected and focused on the detector. However spatial distribution of phase and intensity is not uniform across the beam. This invention provides a solution for the atmospheric effects compensation and mitigation of the beam non-uniformity. An optical beam combiner is proposed which allows compensating phase distortions across the optical beam wavefront.

Figure 1:
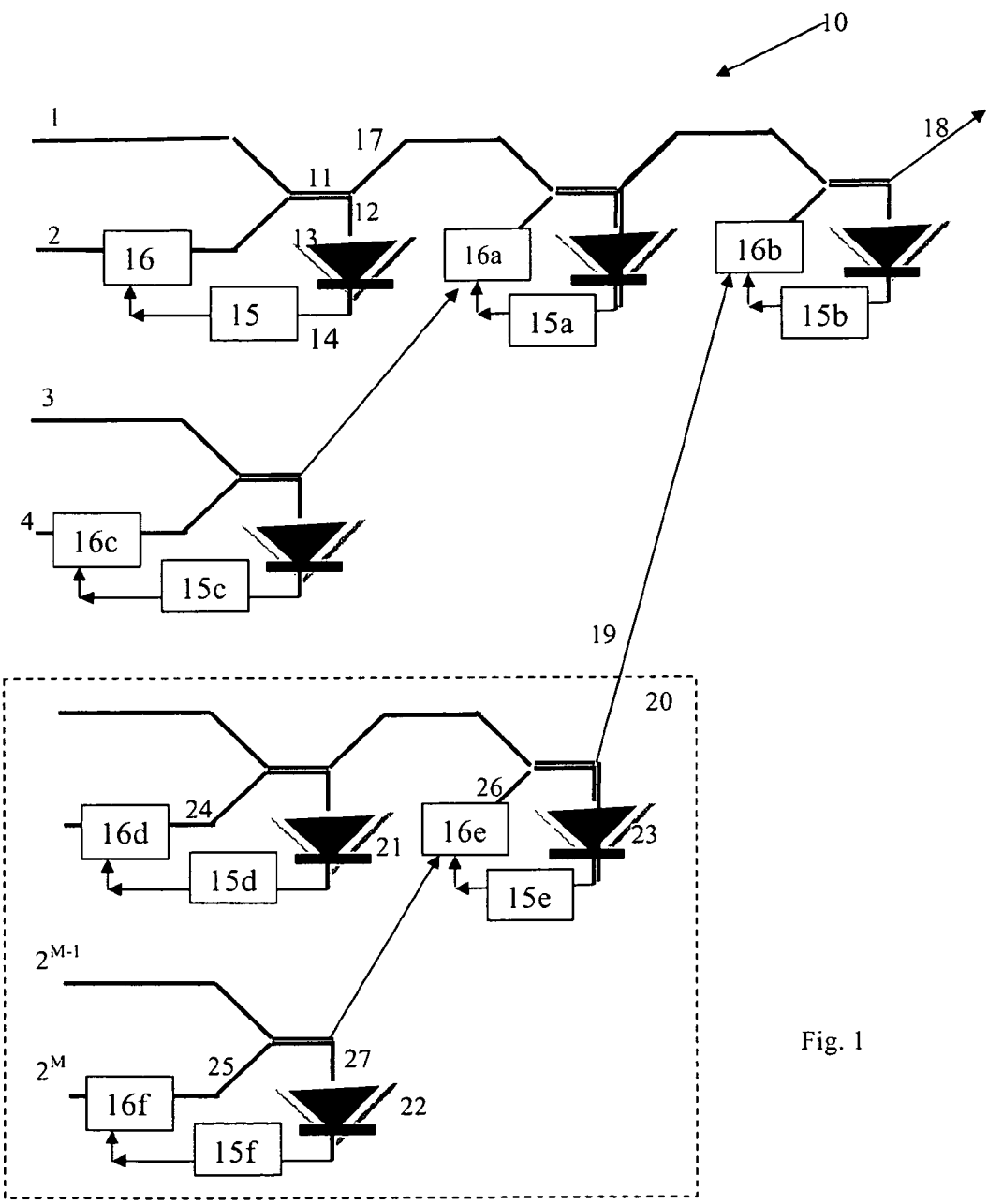
FIG. 1 One embodiment of the combiner of the present invention.

A schematic diagram of the optical beam combiner of the present invention is shown in FIG. 1; it is a part of a receiver. Besides the receiver also includes an optical system to focus the incoming beam on the inputs 1, 2, 3, 4–$2^M$, M is an integer $\geq 2$, a set of detectors and amplifiers (not shown in FIG. 1). For example, the optical system can be a set of lenses, each lens focusing the part of the beam on a corresponding input 1, 2, 3, 4–$2^M$ of the combiner. Alternatively, the incoming beam can be collected by an array of single-mode optical fibers, each fiber being connected to one of the $2^M$ inputs of the combiner 10. All signal entering the inputs 1, 2, 3, 4–$2^M$ have different power. The combiner has (M−1) stages of directional couplers with two output branches each, where one output branch serves for control. The operation of each stage is the following. The waveguides 1 and 2 are coupled together by a coupler 11. The signal from the output 12 is detected by a first detector 13. The power detected by the detector 13 is minimized by detecting the signal and applying it via electronic unit 15 to the phase modulator 16 that changes the phase of the signal in the input waveguide 2 until it is shifted by exactly 90 degrees from the signal in the upper waveguide 1. When the phase shift is equal to 90 degrees, a constructive interference occurs in the upper output branch 17 and a destructive in the lower one 12. When the constructive interference is achieved, the output of the coupler (m,n) becomes $$P_{out}^{(m,n)} = \frac{1}{2}P_{in,1}^{(m,n)} + \frac{1}{2}P_{in,2}^{(m,n)} + \sqrt{P_{in,1}^{(m,n)} P_{in,2}^{(m,n)}}$$
$$= P_{in,1}^{(m,n)} + P_{in,2}^{(m,n)} - \frac{1}{2}\left(\sqrt{P_{in,1}^{(m,n)}} - \sqrt{P_{in,2}^{(m,n)}}\right)^2$$

When the signal in the lower branch is equal to zero, it does not control the phase modulator any longer.

The output signal 18 serves for the further processing, for example, for recovery of the information encoded in the beam.

The combiner consists of multiple interconnected modules as shown in FIG. 1. The smallest module 20 has four inputs, three photodetectors 21, 22, 23 that control phase in the lower waveguides 24, 25, and 26. The output 19 is used for the information recovery. The controls procedure minimizes the signals received by the detectors 21, 22, 23 thus maximizing the output signal 19. These smallest modules, similar to 20, may be combined together in a one-dimensional or two-dimensional matrix. Four inputs of the module can form a line or a square or a rectangular. In the preferred embodiment the input waveguides collect all light across the received optical beam, which typically has round shape. However the geometrical solution of the combiner may or may not follow the shape of the beam. a three-dimensional system of receiving waveguides may be connected to an integrated combiner device with two-dimensional arrangement.

The integrated solution for the combiner will be described in the following sections.

A computer modeling for up 32 input waveguides has been performed, where the system contains up to 5 cascades (M is from 1 to 5) in order to estimate the achievable output power. The number of inputs is related to the number of cascades as $2^M$.

Figure 2:
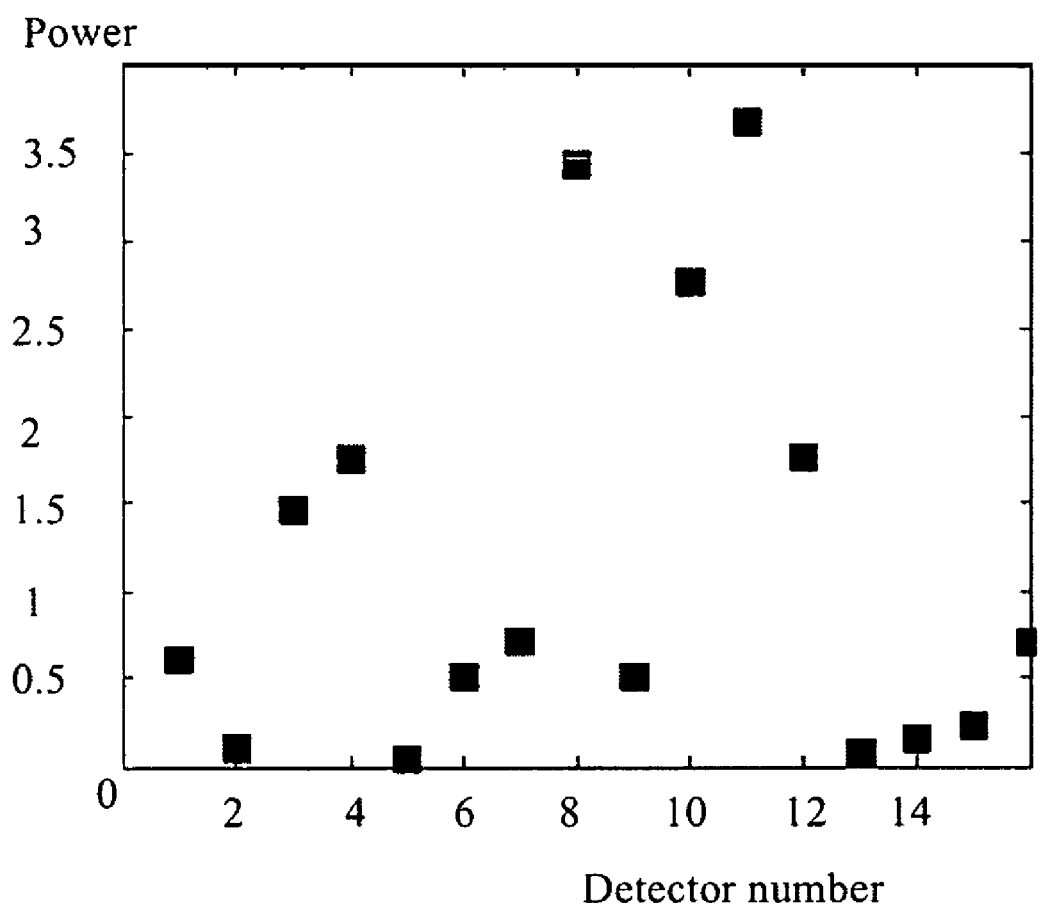
FIG. 2 One example of a random power distribution, which was used in the modeling.

It is assumed that the input powers in are distributed randomly. One example of a random power distribution, which was used in the modeling, is shown in FIG. 2.

The results of the device operation modeling are shown in the histograms of FIGS. 3 (a)-(d). The total power combining efficiency is $$\eta = P_{out} \bigg/ \sum_n P_n.$$

The analytical expression of the mean of the power combining efficiency is:

$$\langle \eta \rangle = \frac{8}{9} + \frac{1}{9N},$$

where $N=2^M$. One can see that typically nearly 90% of the input power is achievable at the output.

Besides phase modulators, the system parameters can be adjusted by controlling the coupling rate of the couplers. The modeling shows that adjustment of the coupling rate of the combiner couplers allows achieving almost 100% of output energy.

Figure 4:
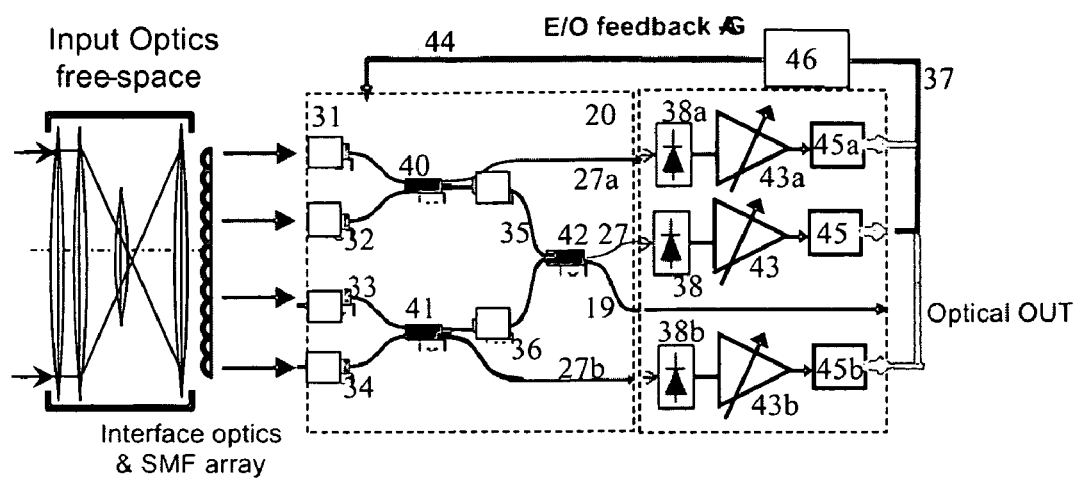
FIG. 4 One embodiment of the receiver of the present invention.

FIG. 4 presents a version of the combiner module 20 of FIG. 1, which is suitable for an integrated solution. Phase shifters 31-36 are controlled by the signal 37 from the detectors 38, 38a and 38b after its processing in a digital signal processing (DSP) unit 39. The DSP unit may also controls the coupling rate of the couplers 40-42. The output signals 27, 27a and 27b detected by the detector 38, 38a and 38b are amplified in TIAs 43, 43a and 43b, then converted into digital signals 44 in A/D converters 45, 45a, 45b. In the preferred embodiment the control signal 44 is chosen to minimize the signal 37 from by the detectors 38, 38a, 38b similar to described above procedure. A digital signal processing (DSP) unit 46 changes the control signal to achieve minimization of the signal 37.

In the preferred embodiment the combiner is a part of a coherent optical receiver with 90-degrees optical hybrid such as described in US Patent Application Pub. No. 20070274733 by the same inventive entity.

Figure 5:
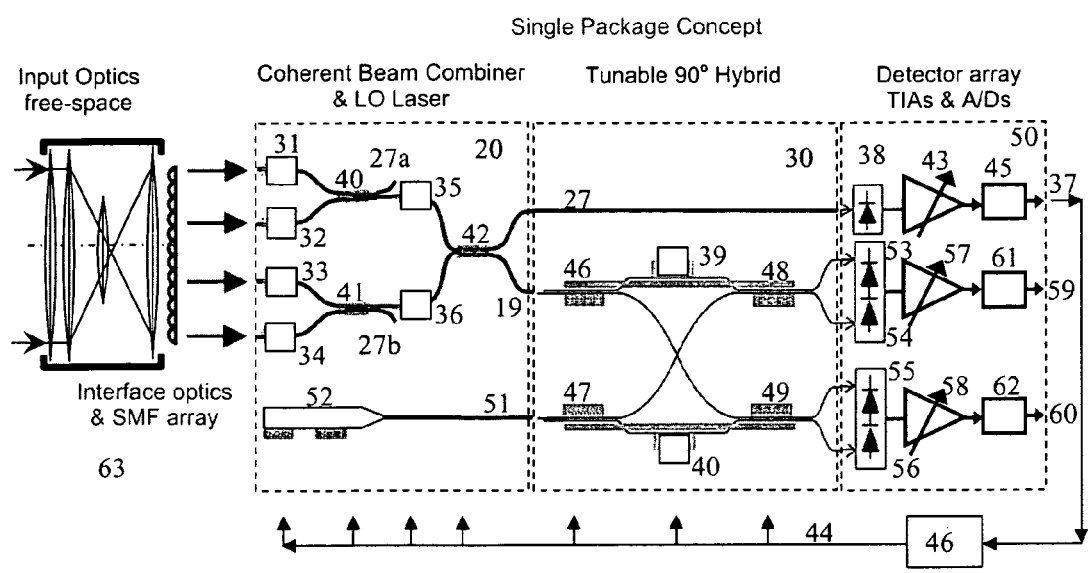
FIG. 5 One of the embodiments of the coherent receiver.

An optical receiver 30 of FIG. 5 consists of three main blocks: the combiner 20, an optical hybrid 30 and a detector array 50. It serves for the signal receiving and coherent detection. The combiner 20 allows energy concentrating into the output 19 as described above. Note, that output branches 27a and 27b are not shown in this FIG. 5 for simplicity, however in the preferred embodiment the combiner is the device shown in FIG. 4. The output signal 19 is mixed with a local oscillator signal 51 from a light source 52 in a 90-degrees optical hybrid 30 followed by a set of detectors 53-56. (The waveguide 27 is a part of the combiner 20.) In the preferred embodiment balanced detectors are used. After the signal amplification in TIAs 57 and 58, they are converted into digital signals 59 and 60 in A/D converters 61 and 62. The signals 59 and 60 can be used for further processing, for the data recovery and display. The signal 37 controls all phase modulators and coupling rates of the couplers. In the preferred embodiment the control signal are chosen to minimize the signal 37 from by the detector 38, similar to described above procedure.

It is beneficial to have phase modulators in both upper and lower branches of the combiner, for example, 31 and 32, 33 and 34, etc. In this case push-pull modulators can be used. However, in principle, the same phase shift can be achieved by implementing only one modulator in one of the branches.

In the preferred embodiment the interface optical unit 63 includes focusing lenses and a bundle of optical fibers. In one embodiment, the focusing optics can be cylindrical.

Figure 6:
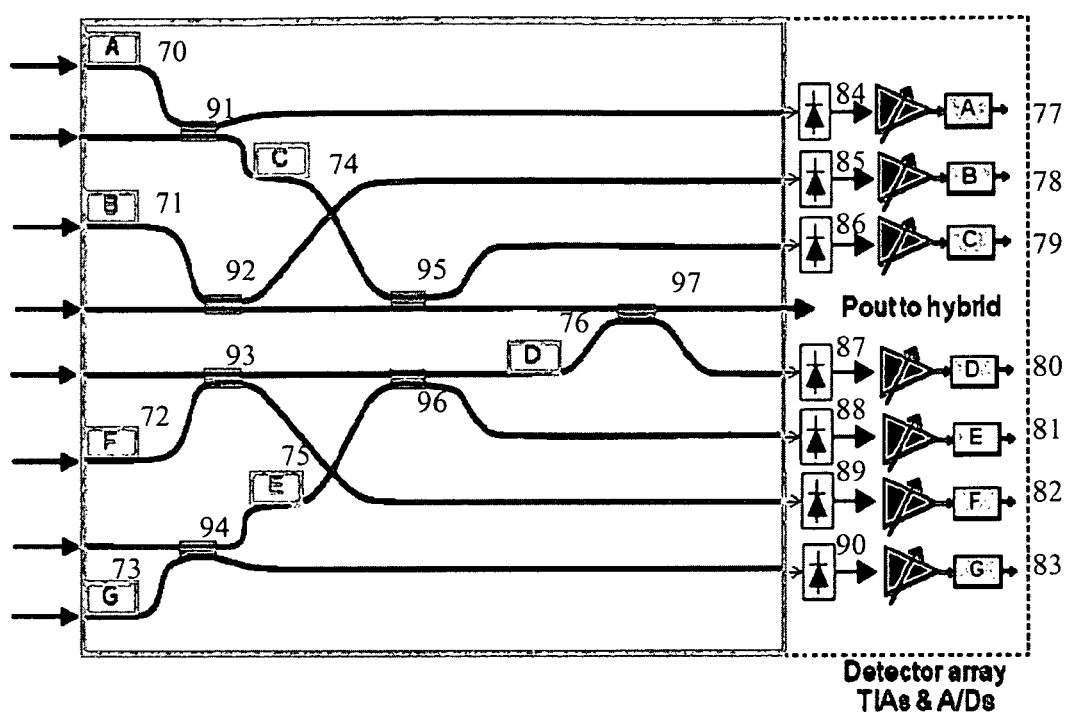
FIG. 6 Integrated solution for the combiner of FIG. 1.

FIG. 6 shows an integrated layout of the combiner 10 of FIG. 1. Phase modulators 70-76 are controlled by the signals 77-83 from the set of photodetectors 84-90. In the preferred embodiment, the control of the modulators 70-76 includes minimizing the output signal from the detectors 84-90 as described above. In another embodiment the signals 77-83 also control the coupling rate of the couplers 91-97, which allows achieving better compensation of the beam non-uniformity.

Figure 7:
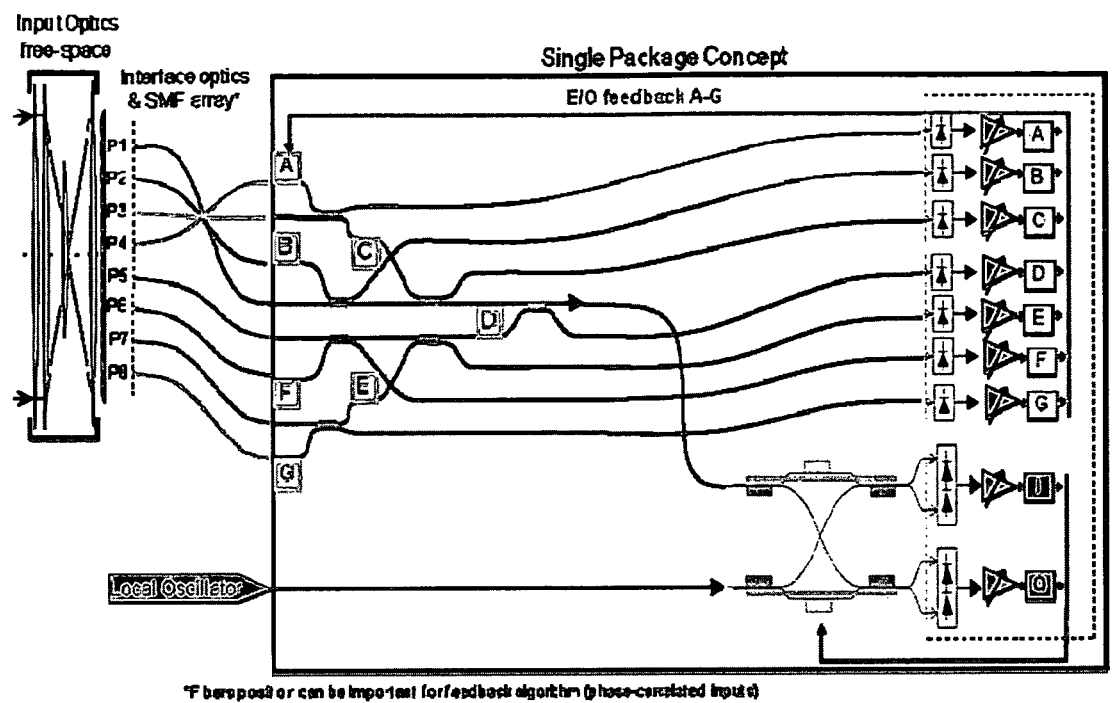
FIG. 7 The preferred embodiment of the integrated receiver.

FIG. 7 represents a coherent optical receiver with the beams combiner as shown in FIG. 6. The disclosed combiner allows phase adjusting of the corrupted light beam, and thus the beam insertion in a single mode fiber or waveguide.

The disclosed beam combiner can be implemented in a variety of optical systems (FIGS. 8 (a-c)). In one embodiment it is a part of a line-of-sight free space communication system as shown in FIG. 8 (a). In FIG. 8 (a) a transmitter 100 sends an encoded laser beam 101 towards a receiver 104. In the preferred embodiment the light source of the transmitter is a pulsed light source. The beam 101 is scattered on multiple inhomogeneities along the optical path forming a cone of light 103. A receiver 104 includes a beam combiner of the present invention, an optical hybrid and a series of photodetectors and amplifiers to control the phase modulators of the combiner followed by DSP unit to recover the transmitted data. The transmitter and receiver may be from 1 to 2000 meters apart.

Another embodiment of the communication system is shown in FIG. 7 (b), where the combiner of the present invention is used in case of non-line of sight transmission.

In yet another embodiment the combiner is used in a system with light reflected from the surface 105 as shown in FIG. 7 (c). Such systems are used, for example, for optical imaging, for remote sensing and other applications.

A free-space optical communications system with the beam combiner as shown in FIGS. 1, 4, 6 is another object of the present invention. In the preferred embodiment the data is transmitted using a phase-shift-keying modulation, preferably QPSK. In yet another embodiment the transmission is performed using orthogonal frequency division multiplexed communications as disclosed in co-pending patent application of the same inventive entity application Ser. No. 12/045,765 filed Mar. 11, 2008 and 12/137,352 filed Jun. 11, 2008.

Data transmission in such system can be performed using a light source generating radiation in multiple wavelengths in UV, visible or infrared range. In the preferred embodiment UV laser radiation is used.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical device that provides an optical beam combining with compensation of the beam wavefront distortions, comprising:
    $2^M$ input waveguides, where M is integer$\geq 2$, receiving portions of the optical beam;
    wherein the incoming optical beam wavefront is spatially divided into 1 sections across the wavefront each $i^{th}$ section has its own phase $\phi_i$ depending on $i^{th}$ optical path from a transmitter to the optical device, wherein $2 \leq i \leq 1$; each $i^{th}$ input waveguide receives $i^{th}$ portion of the optical beam from $i^{th}$ section across the beam wavefront;
    $(2^M-1)$ couplers; each coupler is formed by two waveguides, coming in and out of the coupler;
    control means for changing an input phase of the $i^{th}$ optical beam portion before its coupling;
    one output waveguide forming an input waveguide for a consequent optical coupler from $(2^M-1)$ couplers; an output waveguide from the last coupler forming an output beam of the device; and
    wherein the control means is used to compensate phase distortions occurred in the beam portion while travelling in free space; the control means change the input phases to maximize the output beam energy.

2. The device of claim 1, wherein the control means include a photodetector receiving a beam in the output waveguide from the coupler, producing an electrical signal being used to change the input phase of the $i^{th}$ optical beam portion before its coupling.

3. The device of claim 2, wherein the input phase is changed in a phase modulator connected to the same waveguide before coupling.

4. The device of claim 2, wherein the input phase change leads to minimization of the power of the beam receiving by the photodetector in order to achieve maximized signal in the other output waveguide from the same coupler.

5. The device of claim 1, wherein control means include a digital signal processing unit.

6. The device of claim 1, further comprising: the control means controlling the coupling rate of all couplers to maximize the output beam energy.

7. The device of claim 1, further comprising: an optical receiver to detect the output beam.

8. The device of claim 7, wherein the receiver is a coherent optical receiver.

9. The device of claim 8, further comprising:
a local oscillator, and wherein the receiver is based on a 90-degrees optical hybrid;
the hybrid receiving and mixing the output beam of the device and a local oscillator beam, providing four hybrid output beams; and the hybrid output beams being used to recover information from the optical beam.

10. The device of claim 9, wherein the hybrid includes for four couplers and at least one phase shifter.

11. The device of claim 1, wherein the device is selected from at least one of, an integrated device, a free-space optical link device, and a fiber optics device.

12. The device of claim 11, wherein the integrated device is a chip selected from at least one of a glass, a semiconductor and a ferroelectric material.

13. The device of claim 12, wherein the integrated device is a single chip device.

14. An optical system, comprising:
a light source emitting a light beam;
a transmitter sending the light beam to a receiving unit: the light beam is transmitted in free space and experiences phase distortions on atmospheric inhomogeneities;
the receiving unit including an optical device for the receiving beam combining; the device comprising
$2^M$ input waveguides, where M is integer$\geq 2$, receiving portions of the optical beam;
wherein the incoming optical beam wavefront is spatially divided into 1 sections across the wavefront each $i^{th}$ section has its own phase $\phi_i$ depending on $i^{th}$ optical path from the transmitter to the optical device, wherein $2 \leq i \leq 1$; each $i^{th}$ input waveguide receives $i^{th}$ portion of the optical beam from $i^{th}$ section across the beam wavefront;
$(2^M-1)$ couplers; each coupler is formed by two waveguides, coming in and out of the coupler;
control means for changing an input phase of the $i^{th}$ optical beam portion before its coupling;
one output waveguide forming an input waveguide for a consequent coupler from $(2^M-1)$ couplers; an output waveguide from the last coupler forming an output beam of the device; and
wherein the control means is used to compensate phase distortions occurred in the beam portion while travelling in free space: the control means change the input phases to maximize the output beam energy.

15. The system of claim 14, the control means include a photodetector receiving a beam in the output waveguide, producing an electrical signal being used to change the input phase of the $i^{th}$ optical beam portion in the same waveguide before its coupling; the input phase is changed in a phase modulator connected to the same waveguide before coupling.

16. The device of claim 15, wherein the input phase change leads to minimization of the power of beam receiving by the photodetector in order to achieve maximized signal in the other output waveguide from the same coupler.

17. The system of claim 14, wherein the receiving unit is positioned at least 1-2000 meters from the transmitter.

18. The system of claim 14, wherein the optical beam is reflected from an object forming a reflected beam; the reflected beam is received by the receiving unit.

19. The system of claim 14, wherein the light source generates a spectrum of wavelengths in the ultraviolet, optical or infrared ranges.

20. The optical system of claim 14, wherein the transmitted includes a PSK modulator and the sent beam is encoded using BPSK or QPSK modulation technique.

* * * * *